(12) United States Patent
Choi et al.

(10) Patent No.: US 8,580,350 B2
(45) Date of Patent: Nov. 12, 2013

(54) CORROSION RESISTANT NEUTRON ABSORBING COATINGS

(75) Inventors: Jor-Shan Choi, El Cerrito, CA (US); Joseph C. Farmer, Tracy, CA (US); Chuck K. Lee, Hayward, CA (US); Jeffrey Walker, Gaithersburg, MD (US); Paige Russell, Las Vegas, NV (US); Jon Kirkwood, Saint Leonard, MD (US); Nancy Yang, Lafayette, CA (US); Victor Champagne, Oxford, PA (US)

(73) Assignees: Lawrence Livermore National Security, LLC, Livermore, CA (US); Sandia Corporation, Albuquerque, NM (US); The United States of America as Represented by the Secretary of the Army, Washington, DC (US)

(*) Notice: Subject to any disclaimer, the term of this patent is extended or adjusted under 35 U.S.C. 154(b) by 294 days.

(21) Appl. No.: 12/888,261

(22) Filed: Sep. 22, 2010

(65) Prior Publication Data

US 2011/0014353 A1    Jan. 20, 2011

Related U.S. Application Data

(62) Division of application No. 11/595,623, filed on Nov. 9, 2006.

(60) Provisional application No. 60/737,026, filed on Nov. 14, 2005.

(51) Int. Cl.
*C23C 4/08* (2006.01)
*B22F 7/04* (2006.01)

(52) U.S. Cl.
USPC ........... 427/455; 427/456; 427/598; 428/553; 428/556

(58) Field of Classification Search
USPC .................................... 427/455–456
See application file for complete search history.

(56) References Cited

U.S. PATENT DOCUMENTS 6,767,419 B1    7/2004  Branagan
7,618,500 B2 *  11/2009 Farmer et al. ................. 148/403
(Continued)

FOREIGN PATENT DOCUMENTS

EP    0 016 252    * 11/1979
EP    0 055 371    * 10/1981
(Continued)

OTHER PUBLICATIONS

Farmer, J.C., et al., "Corrosion Resistance of Iron-Bsed Amorphous Metal Coatings," Lawrence Livermore National Laboratory, UCRL-CONF-220537, Apr. 12, 2006, 9 pages.
(Continued)

*Primary Examiner* — Gwendolyn Blackwell
*Assistant Examiner* — Lucas Wang
(74) *Attorney, Agent, or Firm* — Eddie E. Scott

(57) ABSTRACT

A method of forming a corrosion resistant neutron absorbing coating comprising the steps of spray or deposition or sputtering or welding processing to form a composite material made of a spray or deposition or sputtering or welding material, and a neutron absorbing material. Also a corrosion resistant neutron absorbing coating comprising a composite material made of a spray or deposition or sputtering or welding material, and a neutron absorbing material.

1 Claim, 2 Drawing Sheets

(56) References Cited

U.S. PATENT DOCUMENTS

| | | |
|---|---|---|
| 2003/0051781 A1 | 3/2003 | Branagan |
| 2003/0147485 A1* | 8/2003 | Wright et al. .................. 376/272 |
| 2004/0140017 A1 | 7/2004 | Branagan |
| 2004/0140021 A1 | 7/2004 | Branagan |
| 2004/0250926 A1 | 12/2004 | Branagan |
| 2004/0250929 A1 | 12/2004 | Branagan |
| 2004/0253381 A1 | 12/2004 | Branagan |
| 2005/0013723 A1 | 1/2005 | Branagan |
| 2005/0117687 A1 | 6/2005 | Carver et al. |
| 2006/0130944 A1* | 6/2006 | Poon et al. .................... 148/561 |
| 2007/0107809 A1* | 5/2007 | Farmer et al. ................. 148/403 |
| 2007/0107810 A1* | 5/2007 | Farmer .......................... 148/403 |
| 2007/0144621 A1* | 6/2007 | Farmer et al. ................. 148/403 |
| 2007/0243335 A1* | 10/2007 | Belashchenko ............... 427/451 |
| 2007/0281102 A1* | 12/2007 | Hailey et al. ................. 427/421.1 |
| 2010/0028550 A1* | 2/2010 | Farmer et al. ................. 427/455 |
| 2010/0084052 A1* | 4/2010 | Farmer et al. ................. 427/421.1 |

FOREIGN PATENT DOCUMENTS

| | | |
|---|---|---|
| WO | 95/30990 | * 11/1995 |
| WO | WO 2004/072312 A2 | 8/2004 |
| WO | WO 2004/072313 A2 | 8/2004 |

OTHER PUBLICATIONS

Farmer, J.C., et al., "Corrosion Characterization of Iron-Based High-Performance Amorphous-Metal Thermal-Spray Coatings," Lawrence Livermore National Laboratory, UCRL-CONF-210715, Mar. 21, 2005, 18 pages.

* cited by examiner

CORROSION RESISTANT NEUTRON ABSORBING COATINGS

CROSS-REFERENCE TO RELATED APPLICATIONS

This application is a Divisional of application Ser. No. 11/595,623 filed Nov. 9, 2006, entitled "Corrosion Resistant Neutron Absorbing Coatings". This application claims the benefit of U.S. Provisional Patent Application No. 60/737, 026 filed Nov. 14, 2005 and titled "Corrosion Resistant Neutron Absorbing Coatings, which are incorporated herein by this reference.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to corrosion resistant materials and more particularly to corrosion resistant neutron absorbing materials and methods of forming corrosion resistant neutron absorbing materials and coatings. These coatings may include either homogeneous metallic alloys, or metal-ceramic composites, where the metallic alloy or the binder in the metal-ceramic composite could be a boron-containing iron-based amorphous metal, engineered for outstanding corrosion resistance.

2. State of Technology

U.S. Pat. No. 5,744,254 for composite materials including metallic matrix composite reinforcements issued Apr. 28, 1998 to Stephen L. Kampe and Leontios Christodoulou provides the following state of technology information, "Metal matrix composites comprising discontinuous ceramic reinforcements are under consideration for an increasing number of applications. Such composites have been highly touted as efficient material alternatives to conventional ferrous and nickel-base alloys presently incorporated in high performance, high temperature applications. Prominent among those who have invested heavily in the field are the automotive and aerospace industries, in efforts to improve fuel efficiency and performance. Other industries with interest in metal matrix composites include heavy equipment manufacturers and tooling industries such as drilling, mining and the like."

U.S. Pat. No. 6,767,419 for methods of forming hardened surfaces issued Jul. 27, 2004 to Daniel J. Branagan provides the following state of technology information, "Steel is a metallic alloy which can have exceptional strength characteristics, and which is accordingly commonly utilized in structures where strength is required or advantageous. Steel can be utilized, for example, in the skeletal supports of building structures, tools, engine components, and protective shielding of modern armaments."

United States Patent Application No. 2005/0117687 by George Carver et al for container and method for storing or transporting spent nuclear fuel, published Jun. 2, 2005, provides the following state of technology information: "Typically, spent nuclear fuel discharged from fission reactors is stored in deep pools filled with water to dissipate heat and to attenuate the gamma and neutron radiation generated by the fuel. This is called a wet storage system. An alternative method to storing the spent nuclear fuel is a dry storage system that uses a horizontal or vertical configuration having either a heavy wall protected vessel referred to as a cask or over-pack, or a thin walled vessel called a canister. Dry storage systems can also be used to transport spent fuel between storage locations. For dry storage system, the canister can be separately placed into the cask or over-pack. The structure that provides support for the spent nuclear fuel for dry storage and transportation systems is referred to as a fuel basket. The fuel baskets are designed to meet the compressive loads criteria contained within regulations, codes, and standards, particularly conditions for storing and transporting nuclear spent fuel. Dry storage and transportation basket designs include a tube and disk flux trap configuration, an egg crate interlocking plate configuration, a developed cell configuration and a stacked tube configuration."

The article "Corrosion Characterization of Iron-Based High-Performance Amorphous-Metal Thermal-Spray Coatings" by J. C. Farmer et al, ASME Pressure Vessels & Piping Division Conference, Denver, Colo., Jul. 17, 2005 through Jul. 21, 2005 provides the following state of technology information, "New corrosion-resistant, iron-based amorphous metals have been identified from published data or developed through combinatorial synthesis, and tested to determine their relative corrosion resistance. Many of these materials can be applied as coatings with advanced thermal spray technology . . . . Such materials could also be used to coat the entire outer surface of containers for the transportation and long-term storage of spent nuclear fuel, or to protect welds and heat affected zones, thereby preventing exposure to environments that might cause stress corrosion cracking."

The article "Corrosion Resistance of Iron-based Amorphous Metal Coatings" by J. C. Farmer et al, Pressure Vessels & Piping Division, Conference, Vancouver, Canada, Jul. 23, 2006 through Jul. 27, 2006 provides the following state of technology information, "New amorphous-metal thermal-spray coatings have been developed recently that may provide a viable coating option for spent nuclear fuel & high level waste repositories."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

Man-made materials with unusually long service lives are needed for the construction of containers and associated structures for the long-term storage or disposal of spent nuclear fuel (SNF) and high-level waste (HLW) in underground repositories. Man has never designed and constructed any structure or system with the service life required by a SNF and HLW repository. Such systems will be required to contain these radioactive materials for a period as short as 10,000 years, and possibly as long as 300,000 years. The most robust engineering materials known are challenged by such long times.

The present invention provides a method of forming a corrosion resistant neutron absorbing coating comprising the steps of spray or deposition or sputtering or welding processing to form a composite material made of a spray or deposition or sputtering or welding material, and a neutron absorbing material. The present invention also provides a corrosion resistant neutron absorbing coating comprising a composite material made of a spray or deposition or sputtering or welding material, and a neutron absorbing material.

This material can be either a homogeneous metallic alloy or a metal-ceramic composite. The homogeneous metallic alloy or the metallic binder in the metal-ceramic coating can be boron-containing iron-based amorphous metals, engineered for exceptional corrosion resistance.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention. The neutron-absorbing coating may be a thermally sprayed, boron-containing iron-based amorphous metal, engineered for exceptional corrosion resistance. Other amorphous metal coatings, capable of unusual levels of hydrogen absorption, may be used for moderator purposes. Neutron-absorbing and moderator coatings may be combined for beneficial synergistic criticality control effects.

DETAILED DESCRIPTION OF THE INVENTION

Figure 1:
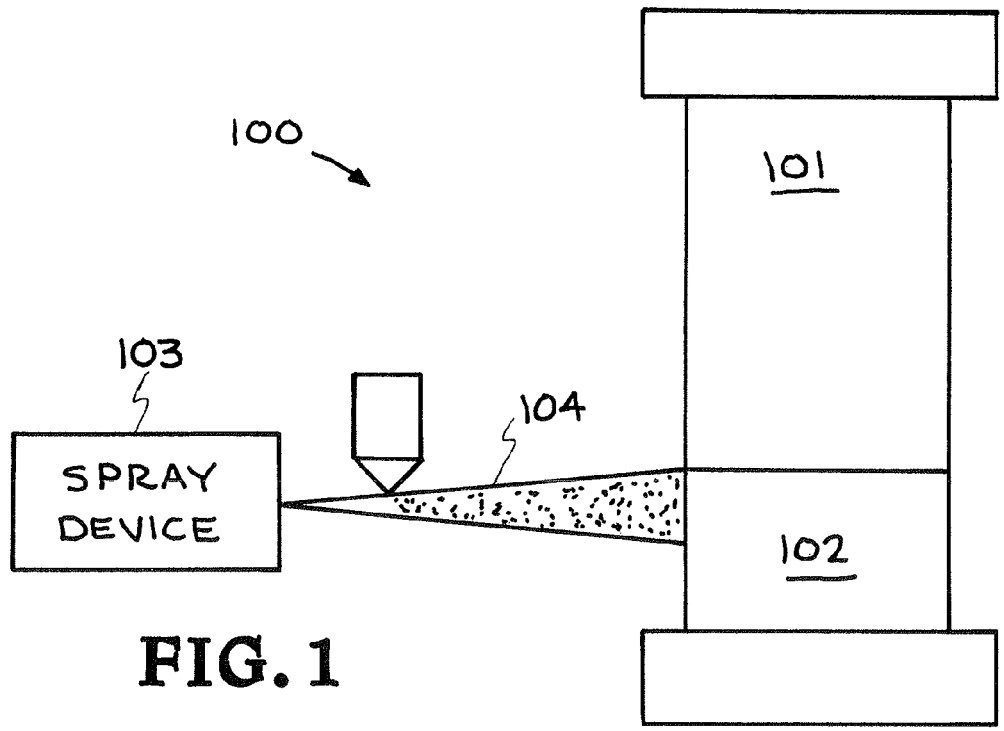
FIG. 1 illustrates a coating being applied to a SNF transportation and storage container.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, one embodiment of a system incorporating the present invention is illustrated. This embodiment is designated generally by the reference numeral 100. The embodiment 100 provides a neutron absorbing coating for spent nuclear fuel (SNF) support structures, particularly for a SNF transportation and storage container 101.

FIG. 1 is an illustration of a coating 102 being applied to the SNF transportation and storage container 101. The coating 102 is being applied by a spray process. A spray device 103 is shown applying a spray 104 to the SNF transportation and storage container 101. In addition to the coating being applied to the SNF transportation and storage container 101, the coating 102 can be applied to spent nuclear fuel (SNF) support structures including metallic support structure used in storage pool racks, in support baskets inside the dry storage containers, inside the transportation casks, and inside the disposal container for spent nuclear fuels.

The coating 102 can be one or more of the following materials: (1) thermally-sprayed iron-based amorphous metals with relatively large concentrations of boron; (2) thermal-spray coating with refractory boride particles including, but not limited to the borides of carbon, titanium, chromium, nickel, and other similar compounds; (3) cold-spray coatings with a relatively soft, corrosion-resistant binder such as aluminum, titanium, zirconium, or other similar metal, with refractory boride particles including, but not limited to the borides of carbon, titanium, chromium, nickel, and other similar compounds; and (4) thermal- or cold-spray as a means of joining plates of boron-containing alloys for use in nuclear fuel assembly support structures; and (5) and such materials with moderators and neutron poisons added. The materials discussed in (1) through (5) can be enhanced with neutron poisons including, but not limited to: (a) gadolinium, (b) hafnium, (c) erbium, (d) dysprosium, and (e) cadmium. The materials discussed in (1) through (5) can also be enhanced with the addition of moderator materials, including but not limited to: (i) carbon, (ii) carbides, (iii) hydrogen isotopes, and (iv) hydrides formed from any of the hydrogen isotopes.

These compositions of matter simultaneously achieve a low reduced glass transition temperature, high heat transfer coefficients, low critical cooling rates, enhanced corrosion resistance, enhanced damage tolerance, and increased hardness. The high content of boron in these compositions enhance the criticality safety of the spent nuclear fuels when they are stored in storage racks, inside the dry storage containers, inside the transportation containers, and in the disposal containers.

The coating 102 and method of applying the coating 102 also includes but is not limited to: the applications of dispersed ceramic particles (diameters ranging from nanometers to several microns), where the ceramic particles consist of at least one alloying element involved in the metal matrix or binder as the neutron-absorbing coatings to the metallic support structure, or as the neutron-absorbing bulk-alloy structural support material to enhance criticality safety for spent nuclear fuel in storage pool racks, in baskets inside the dry storage containers, inside the transportation cask, and eventually inside the disposal container for repository disposal. The ceramic particles may be oxides, borides, carbides, nitrides or hydrides.

This coating 102 and method of applying the coating 102 includes, but is not limited to: the applications of any thermal spray feed that includes ceramic particles, with diameters ranging from nanometers to several microns, and produced by reverse micelle synthesis as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The coating 102 and method of applying the coating 102 includes, but is not limited to: the applications of any metal-ceramic composite coating, where the ceramic particles are oxides, carbides, or nitrides, using corrosion-resistant amorphous-metal formulated matrix or binder as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The coating 102 and method of applying the coating 102 also includes, but is not limited to: the applications of the particle-size optimization method for achieving fully-dense amorphous-metal coatings, a method that uses small enough amorphous metal powders to ensure that the critical cooling rate is achieved throughout, even in cases where the critical cooling rate may be relatively high (≥1000 K per second), as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

Different spray processing systems can be used to form the coating 102, for example the spray processing can be flame spray processing, plasma spray processing, high-velocity oxy-fuel (HVOF) spray processing, high-velocity air-spray (HVAF) processing, or detonation gun processing. The spray processing can be thermal spray processing or cold spray processing.

Unfortunately, if these materials are improperly processed, the powders used to produce the coatings can undergo devitrification, which results in the formation of precipitated crystalline phases of both Cr2B and bcc ferrite. Frequently, these crystalline phases form in particles of relatively large diameter, since it is impossible to maintain the heat transfer conditions above the critical cooling rate across the entire particle diameter. In particular, if particles above 53 microns are crystalline with the undesirable ferrite phase present the coating is impaired. The presence of bcc ferrite has been correlated with poor corrosion performance, and should not be used to produce coatings. The undesirable ferrite may be from the amorphous metal spray by a magnetic field. The magnetic separation can be performed at various positions in the atomization and thermal spray processes.

There are benefits of using magnetic fields in removing deleterious bcc ferrite phases from iron-based amorphous metals, which may served as either the homogeneous metallic alloy, or the metallic binder in the metal-ceramic composite, which can be used as neutron absorbing and/or moderating coatings. Note that a moderator slows down (thermalizes) neutrons so that they can be captured by the neutron-absorbing coating. There are various methods of producing the ceramic (oxide, boride, carbide, nitride, hydride and other) particles, including reverse micelle synthesis, chemical precipitation, electrochemical deposition, chemical vapor deposition, physical vapor deposition, and other such methods.

The coating 102 and method of applying the coating 102 includes, but is not limited to: the applications of the modification of such thermal-spray coatings with post-spray, high-density infrared fusing (HDIF) to achieve lower porosity, higher density, enhanced metallurgical bonding, and better damage tolerance through controlled de-vitrification as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The coating 102 and method of applying the coating 102 includes, but is not limited to: the applications of physical vapor deposition:

Electron beam evaporation of amorphous metals in any manner to maintain cooling the deposit film at a rate higher than the critical cooling rate;

Laser ablation of the homogeneous metallic alloy or any of its constituents in a manner to produce the neutron absorbing coating;

Direct current (dc) and radiofrequency (rf) magnetron sputter deposition of the homogeneous metallic alloy or any of its constituents in a manner to produce the neutron absorbing coating;

Laser ablation of the metallic binder or any of its constituents in a manner to produce the neutron absorbing metal-ceramic composite coating;

Direct current (dc) and radiofrequency (rf) magnetron sputter deposition of the metallic binder or any of its constituents in a manner to produce the neutron absorbing metal-ceramic composite coating;

Direct current (dc) and radiofrequency (rf) magnetron sputter deposition of alloy constituents in multi-layer fashion, with subsequent inter-diffusion and reaction, to create the desired amorphous metal composition as the neutron-absorbing coatings to the metallic support structure to enhance criticality safety for spent nuclear fuel in storage pool racks, in baskets inside the dry storage containers, inside the transportation cask, and eventually inside the disposal container for repository disposal. The applications would probably be done with multi-magnetron sputtering and rotating turntables, as demonstrated with other materials. Variations can also be used, such as the deposition of reactive multi-layers for the purpose of bonding amorphous metals, ceramics, glasses and other material.

The coating 102 and method of applying the coating 102 also includes, but is not limited to: the applications of welding processes for bulk amorphous metals, using amorphous metals with critical cooling rates less than 100K per second as a weld filler as the neutron-absorbing coatings to the metallic support structure to enhance criticality safety for spent nuclear fuel in storage pool racks, in baskets inside the dry storage containers, inside the transportation cask, and eventually inside the disposal container for repository disposal. One example of applying such a glassy weld filler metal is the tungsten-modified SAM1651, a material with an exceptionally low critical cooling rate, which will therefore enable it to be used as an amorphous-metal weld filler material for bulk amorphous metals. The high content of boron in the SAM1651 applied as weld filler material will enhance the criticality safety of the spent nuclear fuels when they are stored in storage racks, inside the dry storage containers, inside the transportation containers, and in the disposal containers.

The coating 102 for metallic support structural material can be less corrosion-resistant stainless steel, or borated stainless steel (such as Boraflex, BORAL™, etc.), or other metallic-based materials (such as carbon steel, the aluminum-based boron-carbide composite METAMIC™, and the nickel-based gadolinium alloy, etc.). These boron-containing iron-based structure amorphous materials (SAM) can also be applied as bulk alloy structural support material for spent nuclear fuels used in storage pool racks, in support baskets inside the dry storage containers, inside the transportation casks, and inside the disposal container emplaced in geologic environment.

The present coating 102 and method of applying the coating 102 provides the application of a new class of boron-containing High-Performance Corrosion-Resistant Metal (HPCRM) as coatings. The use of advanced corrosion-resistant materials to prevent corrosion of these important surface areas is extremely beneficial. In addition, the corrosion prevention also prevents nuclear criticality in spent fuel storage, transportation, and/or disposal, neutron-absorbing materials (or neutron poisons, such as borated stainless steel, BORAL™, METAMIC™, Ni—Gd, and others).

Figure 2:
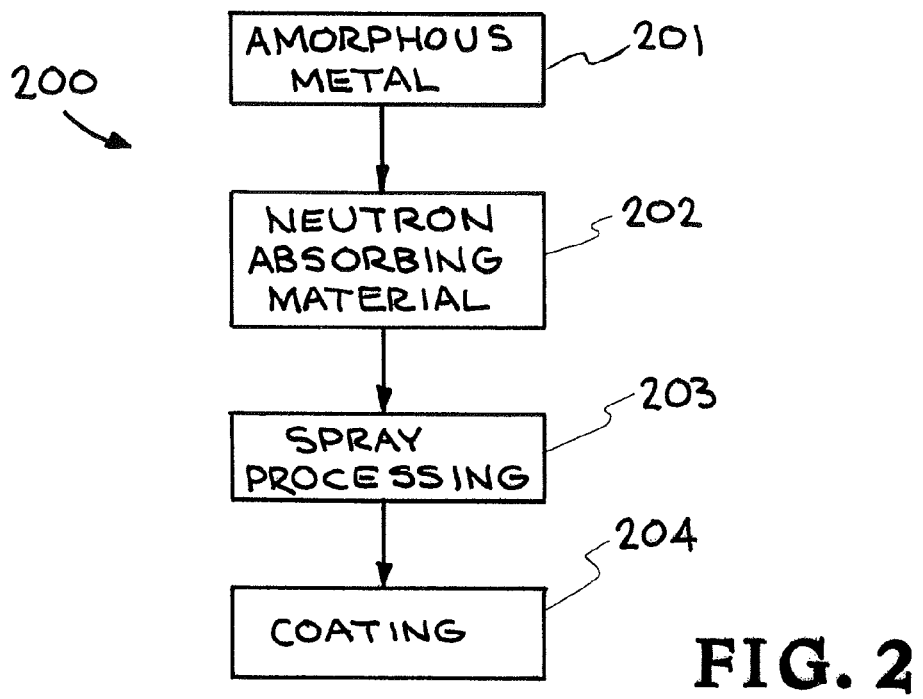
FIG. 2 illustrates an amorphous metal and neutron absorbing material used to form a coating.

Referring now to FIG. 2, another embodiment of a system incorporating the present invention is illustrated. This embodiment is designated generally by the reference numeral 200. The embodiment 200 provides neutron absorbing coatings for spent nuclear fuel (SNF) support structures, particularly for SNF transportation and storage containers. The corrosion resistant coating is produced by spray processing to form a composite material made of amorphous metal and neutron absorbing material. As illustrated in FIG. 2, an amorphous metal 201 and neutron absorbing material 202 are used to form a coating 204.

The coating 204 is formed by spray processing 203 as illustrated in FIG. 2. The spray processing 204 can be thermal spray processing or cold spray processing. Different spray processing 204 can be used to form the coating 204, for example the spray processing can be flame spray processing, plasma spray processing, high-velocity oxy-fuel (HVOF) spray processing, high-velocity air-spray (HVAF) processing, or detonation gun processing.

The articles, "Corrosion Characterization of Iron-Based High-Performance Amorphous-Metal Thermal-Spray Coatings" by J. C. Farmer et al, ASME Pressure Vessels & Piping Division Conference, Denver, Colo., Jul. 17, 2005 through Jul. 21, 2005 and "Corrosion Resistance of Iron-based Amorphous Metal Coatings" by J. C. Farmer et al, Pressure Vessels & Piping Division, Conference, Vancouver, Canada, Jul. 23, 2006 through Jul. 27, 2006 describe new amorphous-metal thermal-spray coatings that have been developed recently that may provide a viable coating option for spent nuclear fuel & high level waste repositories. The disclosures of the articles, "Corrosion Characterization of Iron-Based High-Performance Amorphous-Metal Thermal-Spray Coatings" by J. C. Farmer et al, ASME Pressure Vessels & Piping Division Conference, Denver, Colo., Jul. 17, 2005 through Jul. 21, 2005 and "Corrosion Resistance of Iron-based Amorphous Metal Coatings" by J. C. Farmer et al, Pressure Vessels & Piping Division, Conference, Vancouver, Canada, Jul. 23, 2006 through Jul. 27, 2006 are incorporated herein by this reference.

The present invention provides neutron absorbing coatings for spent nuclear fuel (SNF) support structures including the following:

Structural support baskets inside containers for the transportation and long-term storage of spent nuclear fuel (SNF), coated with boron-containing iron-based corrosion-resistant amorphous-metal or metal-ceramic coatings, that are applied with thermal- or cold-spray processes, physical vapor deposition, chemical vapor deposition, sputter deposition, or any other application process.

Applying the thermally sprayed, or otherwise deposited (cold-spray, physical vapor deposition, chemical vapor deposition, etc.), ceramic coating, based on either oxides or carbides, using boron-containing, corrosion-resistant amorphous metal formulations, and boron-containing corrosion-resistant binders for the sprayed ceramics to the structural support baskets inside spent fuel storage, transportation, and disposal containers.

Materials for such long-lived corrosion-resistant neutron-absorbing coatings including, but not limited to: (a) thermally-sprayed iron-based amorphous metals with any concentration of neutron-absorbing boron; (b) any thermal-spray coating with refractory boride particles including, but not limited to the borides of carbon, titanium, chromium, nickel, and other similar compounds; (c) cold-spray coatings with a relatively soft, corrosion-resistant binder such as aluminum, titanium, zirconium, or other similar metal, with refractory boride particles including, but not limited to the borides of carbon, titanium, chromium, nickel, and other similar compounds; and (d) the use of thermal- or cold-spray as a means of joining plates of boron-containing alloys for use in nuclear fuel assembly support structures; (e) and such materials with moderators and neutron poisons added; (f) any such coatings with thicknesses greater than one millimeter, a thickness known to significantly reduce the overall effective criticality factor in spent nuclear fuel storage, transportation and disposal canisters. Coatings of particular interest are those that range from one to twenty millimeters, with particular interest in coatings with thickness ranging from three to seven millimeters.

Enhanced materials for such coatings with neutron poisons including, but not limited to: (a) gadolinium, (b) hafnium, (c) erbium, (d) dysprosium, and (e) cadmium.

Enhanced materials for such coatings with the addition of moderator materials, including but not limited to: (i) carbon, (ii) carbides, (iii) hydrogen isotopes, and (iv) hydrides formed from any of the hydrogen isotopes.

A neutron absorbing material for the support of nuclear fuel rods formed from amorphous-metal alloys with enhanced concentrations of yttrium ($\geq 1$ atomic %), chromium (10 to 20 atomic %), molybdenum ($\geq 5$ atomic %), tungsten additions ($\geq 1$ atomic %), boron ($\leq 10$ atomic %), carbon, and possible dispersions of ceramic particles, to simultaneously achieve neutron absorption, neutron moderation, low reduced glass transition temperature, high heat transfer coefficients, enhanced corrosion resistance, enhanced damage tolerance, and increased hardness, to the structural support baskets inside spent fuel storage, transportation, and disposal containers.

A neutron absorbing material for the support of nuclear fuel rods formed from amorphous-metal alloys containing yttrium, chromium, molybdenum, tungsten, boron, carbon, and dispersed ceramic particles, to simultaneously achieve neutron absorption, neutron moderation, low reduced glass transition temperature, high heat transfer coefficients, enhanced corrosion resistance, enhanced damage tolerance, and increased hardness, to the structural support baskets inside spent fuel storage, transportation, and disposal containers.

Applying all modified Fe-based amorphous metal formulations, with the intentional inclusion of oxide ceramic nanoparticles, where the oxide consists of at least one alloying element involved in the metal matrix, for the purpose of enhancing hardness or damage tolerance to the structural support baskets inside spent fuel storage, transportation, and disposal containers.

Applying the HVOF coatings with post-spray high-density infrared fusing to achieve enhanced metallurgical bonding, and to control damage tolerance through controlled de-vitrification to the structural support baskets inside spent fuel storage, transportation, and disposal containers.

Applying the High-Performance Corrosion Resistant Materials such as LMDAR1922 discovered through the application of the statistical-thermochemical methodology to the structural support baskets inside spent fuel storage, transportation, and disposal containers.

Applying the sputter deposition of alloy constituents in multi-layer fashion, with subsequent inter-diffusion and reaction, to create the desired amorphous metal composition to the structural support baskets inside spent fuel storage, transportation, and disposal containers. This would probably be done with multi-magnetron sputtering and rotating turntables, as demonstrated with other materials, but could also use other variations.

Applying the amorphous metal welding process using SAM1651 or compositional modifications thereof to the structural support baskets inside spent fuel storage, transportation, and disposal containers. This material (SAM1651) has an exceptionally low critical cooling rate, which will enable it to be used as an "amorphous metal weld filler material" for bulk materials. The high content of boron in SAM1651 can enhance the criticality safety at the joint and weld locations.

Applying the coating processes that use cold-spray methodology to deposit mechanically hard, corrosion-resistant amorphous metals, using a softer corrosion-resistant metal or binder to enable this low-temperature coating process to the structural support baskets inside spent fuel storage, transportation, and disposal containers.

Applying the processes for the deposition phosphorous-containing iron-based amorphous-metal coatings, that rely on cold-spray methodology to overcome problems associated with the thermal-spray of phosphorous containing materials (including the possible generation of volatile, organo-phosphorous compounds) to the structural support baskets inside spent fuel storage, transportation, and disposal containers. The refinement of particle-sizes for thermal- and cold-spray processes through the use of cryogenic milling.

The use of advanced corrosion-resistant materials to prevent corrosion of these important surface areas is extremely beneficial. In addition, the corrosion prevention also prevents nuclear criticality in spent fuel storage, transportation, and/or disposal, neutron-absorbing materials (or neutron poisons, such as borated stainless steel, BORAL™, METAMIC™, Ni—Gd, and others).

The present invention provides the application of a new class of boron-containing High-Performance Corrosion-Resistant Metal (HPCRM) as coatings to the metallic support structure used in storage pool racks, in support baskets inside the dry storage containers, inside the transportation casks, and inside the disposal container for spent nuclear fuels. These materials include: (1) thermally-sprayed iron-based amorphous metals with relatively large concentrations of boron; (2) any thermal-spray coating with refractory boride particles including, but not limited to the borides of carbon, titanium, chromium, nickel, and other similar compounds; (3) cold-spray coatings with a relatively soft, corrosion-resistant binder such as aluminum, titanium, zirconium, or other similar metal, with refractory boride particles including, but not limited to the borides of carbon, titanium, chromium, nickel, and other similar compounds; and (4) the use of thermal- or cold-spray as a means of joining plates of boron-containing alloys for use in nuclear fuel assembly support structures; and (5) and such materials with moderators and neutron poisons added. The materials discussed in (1) through (5) can be enhanced with neutron poisons including, but not limited to: (a) gadolinium, (b) hafnium, (c) erbium, (d) dysprosium, and (e) cadmium. The materials discussed in (1) through (5) can also be enhanced with the addition of moderator materials, including but not limited to: (i) carbon, (ii) carbides, (iii) hydrogen isotopes, and (iv) hydrides formed from any of the hydrogen isotopes. The metallic support structural material can be the less corrosion-resistant stainless steel, or borated stainless steel (such as Boraflex, BORAL™, etc.), or other metallic-based materials (such as carbon steel, the aluminum-based boron-carbide composite METAMIC™, and the nickel-based gadolinium alloy, etc.). The applications of these boron-containing, iron-based amorphous metals are achieved with advanced thermal spray technology. These boron-containing iron-based structure amorphous materials (SAM) can also be applied as bulk alloy structural support material for spent nuclear fuels used in storage pool racks, in support baskets inside the dry storage containers, inside the transportation casks, and inside the disposal container emplaced in geologic environment.

Uses of the present invention include the applications of:
Thermally-sprayed iron-based amorphous metals with relatively large concentrations of boron;
Such coatings with refractory boride particles including, but not limited to the borides of carbon, titanium, chromium, nickel, and other similar compounds;
Cold-spray coatings with a relatively soft, corrosion-resistant binder such as aluminum, titanium, zirconium, or other similar metal, with refractory boride particles including, but not limited to the borides of carbon, titanium, chromium, nickel, and other similar compounds;
The use of thermal- or cold-spray as a means of joining plates of boron-containing alloys for use in nuclear fuel assembly support structures;
Such materials with moderators and neutron poisons added.
The enhancement of these materials with neutron poisons including, but not limited to: (a) gadolinium, (b) hafnium, (c) erbium, and (d) dysprosium, and
The enhancement of these materials with the addition of moderators, including but not limited to: (a) carbon, (b) carbides, (c) hydrogen isotopes, and (d) hydrides formed from any of the hydrogen isotopes as the neutron-absorbing coatings to the metallic support structure, or as the neutron-absorbing bulk-alloy structural support material to enhance criticality safety for spent nuclear fuel in storage pool racks, in baskets inside the dry storage containers, inside the transportation cask, and eventually inside the disposal container for repository disposal.

These compositions of matter simultaneously achieve a low reduced glass transition temperature, high heat transfer coefficients, low critical cooling rates, enhanced corrosion resistance, enhanced damage tolerance, and increased hardness. The high content of boron in these compositions enhance the criticality safety of the spent nuclear fuels when they are stored in storage racks, inside the dry storage containers, inside the transportation containers, and in the disposal containers.

The invention also includes but is not limited to: the applications of dispersed oxide ceramic particles (diameters ranging from nanometers to several microns), where the oxide particles consist of at least one alloying element involved in the metal matrix or binder as the neutron-absorbing coatings to the metallic support structure, or as the neutron-absorbing bulk-alloy structural support material to enhance criticality safety for spent nuclear fuel in storage pool racks, in baskets inside the dry storage containers, inside the transportation cask, and eventually inside the disposal container for repository disposal.

This invention includes, but is not limited to: the applications of any thermal spray feed that includes ceramic particles, with diameters ranging from nanometers to several microns, and produced by reverse micelle synthesis as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The invention includes, but is not limited to: the applications of any metal-ceramic composite coating, where the ceramic particles are oxides, carbides, or nitrides, using corrosion-resistant amorphous-metal formulated matrix or binder as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The invention also includes, but is not limited to: the applications of the particle-size optimization method for achieving fully-dense amorphous-metal coatings, a method that uses small enough amorphous metal powders to ensure that the critical cooling rate is achieved throughout, even in cases where the critical cooling rate may be relatively high (≧1000 K per second), as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The invention includes, but is not limited to: the applications of the modification of such thermal-spray coatings with post-spray, high-density infrared fusing (HDIF) to achieve lower porosity, higher density, enhanced metallurgical bonding, and better damage tolerance through controlled de-vitrification as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The invention includes, but is not limited to the applications of:

Electron beam evaporation of amorphous metals in any manner to maintain cooling the deposit film at a rate higher than the critical cooling rate;
  Laser ablation of the homogeneous metallic alloy or any of its constituents in a manner to produce the neutron absorbing coating;
  Direct current (dc) and radiofrequency (rf) magnetron sputter deposition of the homogeneous metallic alloy or any of its constituents in a manner to produce the neutron absorbing coating;
  Laser ablation of the metallic binder or any of its constituents in a manner to produce the neutron absorbing metal-ceramic composite coating;
  Direct current (dc) and radiofrequency (rf) magnetron sputter deposition of the metallic binder or any of its constituents in a manner to produce the neutron absorbing metal-ceramic composite coating;
  Direct current (dc) and radiofrequency (rf) magnetron sputter deposition of alloy constituents in multi-layer fashion, with subsequent inter-diffusion and reaction, to create the desired amorphous metal composition as the neutron-absorbing coatings to the metallic support structure to enhance criticality safety for spent nuclear fuel in storage pool racks, in baskets inside the dry storage containers, inside the transportation cask, and eventually inside the disposal container for repository disposal. The applications would probably be done with multi-magnetron sputtering and rotating turntables, as demonstrated with other materials. Variations can also be used, such as the deposition of reactive multi-layers for the purpose of bonding amorphous metals, ceramics, glasses and other material.

The invention also includes, but is not limited to: the applications of welding processes for bulk amorphous metals, using amorphous metals with critical cooling rates less than 100K per second as a weld filler as the neutron-absorbing coatings to the metallic support structure to enhance criticality safety for spent nuclear fuel in storage pool racks, in baskets inside the dry storage containers, inside the transportation cask, and eventually inside the disposal container for repository disposal. One example of applying such a glassy weld filler metal is the tungsten-modified SAM1651, a material with an exceptionally low critical cooling rate, which will therefore enable it to be used as an amorphous-metal weld filler material for bulk amorphous metals. The high content of boron in the SAM1651 applied as weld filler material will enhance the criticality safety of the spent nuclear fuels when they are stored in storage racks, inside the dry storage containers, inside the transportation containers, and in the disposal containers.

Figure 3:
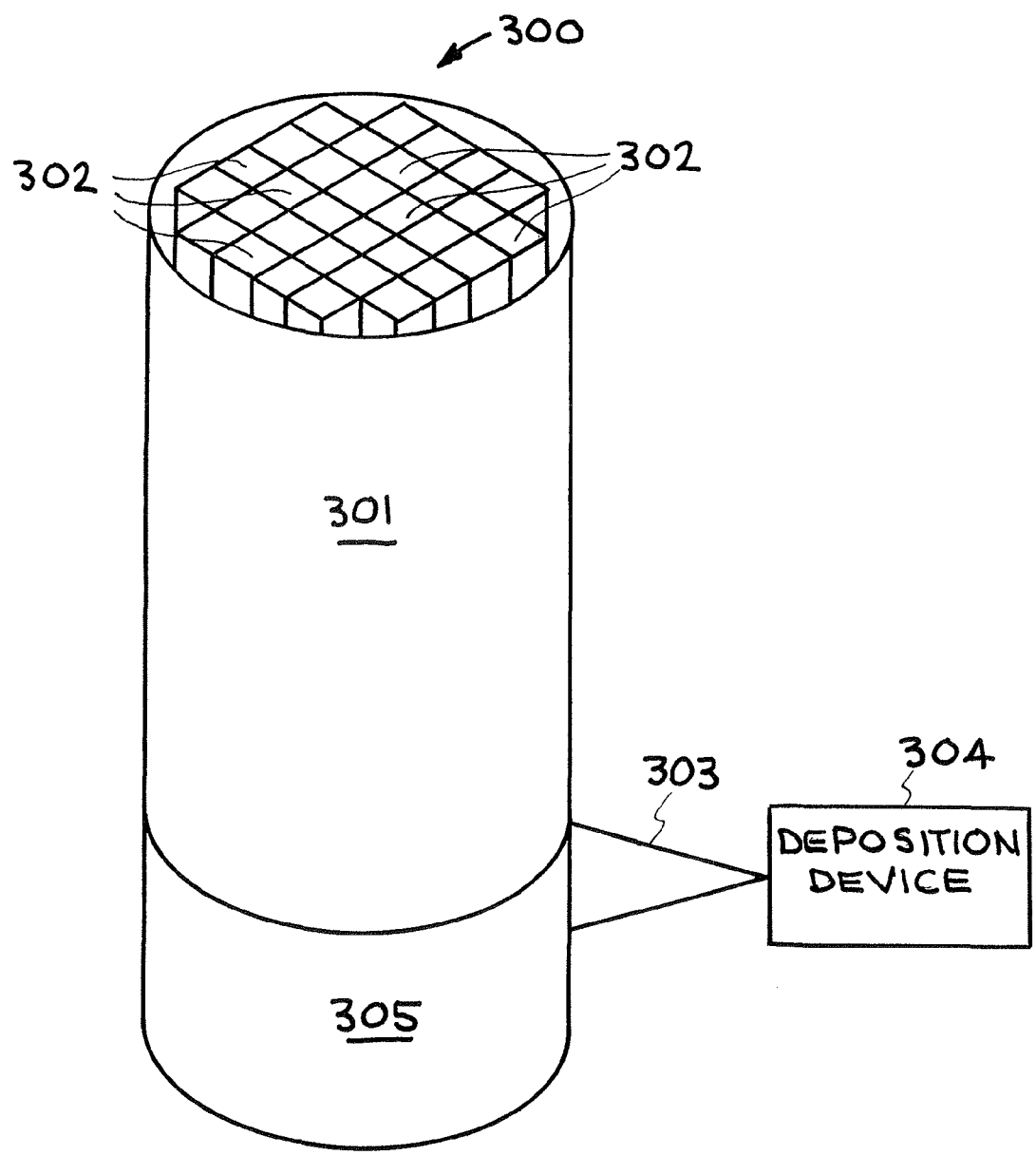
FIG. 3 illustrates a coating being applied to a SNF transportation and storage container by a deposition process.

Referring now to FIG. 3, another embodiment of a system incorporating the present invention is illustrated. This embodiment is designated generally by the reference numeral 300. The embodiment 300 provides a neutron absorbing coatings for spent nuclear fuel (SNF) support structures, particularly for SNF transportation and storage containers.

FIG. 3 is a perspective view of an embodiment of a container 301 with a tube assembly inside the container 301 that stores spent nuclear fuel. Examples and additional details of the container 301 are shown in United States Patent Application No. 2005/0117687 by George Carver et al for container and method for storing or transporting spent nuclear fuel, published Jun. 2, 2005. United States Patent Application No. 2005/0117687 by George Carver et al for container and method for storing or transporting spent nuclear fuel, published Jun. 2, 2005 is incorporated herein by reference. Other components for the handling and storage of spent nuclear material include storage pool racks, in baskets inside the dry storage containers, inside the transportation cask, and eventually inside the disposal container for repository disposal.

The container 301 includes a plurality of elongated tubes 302 that links together to form the tube assembly. The elongated tubes 302 include four sidewalls and four corners that can be arranged to form a square-like or rectangular-like cross section. In alternative embodiments, the tubes can be arranged in other geometric shapes, e.g., circle, triangle, heptagon, hexagon and octagon. The components for the handling and storage of spent nuclear material such as storage pool racks, baskets inside the dry storage containers, inside the transportation cask, and inside the disposal container for repository disposal undergoing corrosion. The use of advanced corrosion-resistant materials to prevent corrosion of these important surface areas would be extremely beneficial. In addition, the corrosion prevention also needs to prevent nuclear criticality in spent fuel storage, transportation, and/or disposal, neutron-absorbing materials (or neutron poisons, such as borated stainless steel, BORAL™, METAMIC™, Ni—Gd, and others).

The tubes 302 are mounted with first rods (not shown) or second rods (not shown) or both. Preferably, the first rods are cylindrical and have openings that are located about the center diameter and along the length of the first rods. The second rods are cylindrical and have no openings. The first rods enable the tubes 302 to be linked together. The first rods and the second rods facilitate horizontal design load transfer through the tube assembly and provide structural stability during the tube assembling and handling activities. In an alternative embodiment, the first rods and second rods can be in other geometric shapes, e.g., triangle, hexagon, and octagon. The container 301 and other components for the handling and storage of spent nuclear material are coated with advanced corrosion-resistant materials to prevent corrosion of these important surface areas.

The present invention provides the application of the new class of boron-containing High-Performance Corrosion-Resistant Metal (HPCRM) as coatings to the metallic support structure used in storage pool racks, in support baskets inside the dry storage containers, inside the transportation casks, and inside the disposal container for spent nuclear fuels. These materials include: (1) thermally-sprayed iron-based amorphous metals with relatively large concentrations of boron; (2) any thermal-spray coating with refractory boride particles including, but not limited to the borides of carbon, titanium, chromium, nickel, and other similar compounds; (3) cold-spray coatings with a relatively soft, corrosion-resistant binder such as aluminum, titanium, zirconium, or other similar metal, with refractory boride particles including, but not limited to the borides of carbon, titanium, chromium, nickel, and other similar compounds; and (4) the use of thermal- or cold-spray as a means of joining plates of boron-containing alloys for use in nuclear fuel assembly support structures; and (5) and such materials with moderators and neutron poisons added. The materials discussed in (1) through (5) can be enhanced with neutron poisons including, but not limited to: (a) gadolinium, (b) hafnium, (c) erbium, (d) dysprosium, and (e) cadmium. The materials discussed in (1) through (5) can also be enhanced with the addition of moderator materials, including but not limited to: (i) carbon, (ii) carbides, (iii) hydrogen isotopes, and (iv) hydrides formed from any of the hydrogen isotopes. The metallic support structural material can be the less corrosion-resistant stainless steel, or borated stainless steel (such as Boraflex, BORAL™, etc.), or other metallic-based materials (such as carbon steel, the aluminum-based boron-carbide composite METAMIC™, and the nickel-based gadolinium alloy, etc.). The applications of these boron-containing, iron-based amorphous metals are achieved with advanced thermal spray technology. These boron-containing iron-based structure amorphous materials (SAM) can also be applied as bulk alloy structural support material for spent nuclear fuels used in storage pool racks, in support baskets inside the dry storage containers, inside the transportation casks, and inside the disposal container emplaced in geologic environment.

Uses of the present invention include the applications of:

Thermally-sprayed iron-based amorphous metals with relatively large concentrations of boron;

Such coatings with refractory boride particles including, but not limited to the borides of carbon, titanium, chromium, nickel, and other similar compounds;

Cold-spray coatings with a relatively soft, corrosion-resistant binder such as aluminum, titanium, zirconium, or other similar metal, with refractory boride particles including, but not limited to the borides of carbon, titanium, chromium, nickel, and other similar compounds;

The use of thermal- or cold-spray as a means of joining plates of boron-containing alloys for use in nuclear fuel assembly support structures;

Such materials with moderators and neutron poisons added.

The enhancement of these materials with neutron poisons including, but not limited to: (a) gadolinium, (b) hafnium, (c) erbium, and (d) dysprosium, and The enhancement of these materials with the addition of moderators, including but not limited to: (a) carbon, (b) carbides, (c) hydrogen isotopes, and (d) hydrides formed from any of the hydrogen isotopes as the neutron-absorbing coatings to the metallic support structure, or as the neutron-absorbing bulk-alloy structural support material to enhance criticality safety for spent nuclear fuel in storage pool racks, in baskets inside the dry storage containers, inside the transportation cask, and eventually inside the disposal container for repository disposal.

These compositions of matter simultaneously achieve a low reduced glass transition temperature, high heat transfer coefficients, low critical cooling rates, enhanced corrosion resistance, enhanced damage tolerance, and increased hardness. The high content of boron in these compositions enhance the criticality safety of the spent nuclear fuels when they are stored in storage racks, inside the dry storage containers, inside the transportation containers, and in the disposal containers.

The invention also includes but is not limited to: the applications of dispersed oxide ceramic particles (diameters ranging from nanometers to several microns), where the oxide particles consist of at least one alloying element involved in the metal matrix or binder as the neutron-absorbing coatings to the metallic support structure, or as the neutron-absorbing bulk-alloy structural support material to enhance criticality safety for spent nuclear fuel in storage pool racks, in baskets inside the dry storage containers, inside the transportation cask, and eventually inside the disposal container for repository disposal.

This invention includes, but is not limited to: the applications of any thermal spray feed that includes ceramic particles, with diameters ranging from nanometers to several microns, and produced by reverse micelle synthesis as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The invention includes, but is not limited to: the applications of any metal-ceramic composite coating, where the ceramic particles are oxides, carbides, or nitrides, using corrosion-resistant amorphous-metal formulated matrix or binder as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The invention also includes, but is not limited to: the applications of the particle-size optimization method for achieving fully-dense amorphous-metal coatings, a method that uses small enough amorphous metal powders to ensure that the critical cooling rate is achieved throughout, even in cases where the critical cooling rate may be relatively high ($\geq 1000$ K per second), as the neutron-absorbing coatings to the metallic support structure to enhance criticality safety for spent nuclear fuel in storage pool racks, in baskets inside the dry storage containers, inside the transportation cask, and eventually inside the disposal container for repository disposal.

The invention includes, but is not limited to the applications of:

Electron beam evaporation of amorphous metals in any manner to maintain cooling the deposit film at a rate higher than the critical cooling rate;

Laser ablation of the homogeneous metallic alloy or any of its constituents in a manner to produce the neutron absorbing coating;

Direct current (dc) and radiofrequency (rf) magnetron sputter deposition of the homogeneous metallic alloy or any of its constituents in a manner to produce the neutron absorbing coating;

Laser ablation of the metallic binder or any of its constituents in a manner to produce the neutron absorbing metal-ceramic composite coating;

Direct current (dc) and radiofrequency (rf) magnetron sputter deposition of the metallic binder or any of its constituents in a manner to produce the neutron absorbing metal-ceramic composite coating;

Direct current (dc) and radiofrequency (rf) magnetron sputter deposition of alloy constituents in multi-layer fashion, with subsequent inter-diffusion and reaction, to create the desired amorphous metal composition as the neutron-absorbing coatings to the metallic support structure to enhance criticality safety for spent nuclear fuel in storage pool racks, in baskets inside the dry storage containers, inside the transportation cask, and eventually inside the disposal container for repository disposal. The applications would probably be done with multi-magnetron sputtering and rotating turntables, as demonstrated with other materials. Variations can also be used, such as the deposition of reactive multi-layers for the purpose of bonding amorphous metals, ceramics, glasses and other material.

The invention also includes, but is not limited to: the applications of welding processes for bulk amorphous metals, using amorphous metals with critical cooling rates less than 100K per second as a weld filler as the neutron-absorbing coatings to the metallic support structure to enhance criticality safety for spent nuclear fuel in storage pool racks, in baskets inside the dry storage containers, inside the transportation cask, and eventually inside the disposal container for repository disposal. One example of applying such a glassy weld filler metal is the tungsten-modified SAM1651, a material with an exceptionally low critical cooling rate, which will therefore enable it to be used as an amorphous-metal weld filler material for bulk amorphous metals. The high content of boron in the SAM1651 applied as weld filler material will enhance the criticality safety of the spent nuclear fuels when they are stored in storage racks, inside the dry storage containers, inside the transportation containers, and in the disposal containers.

FIG. 3 shows the coating 305 being applied to the SNF transportation and storage container 301. The coating 305 is being applied by a deposition process. A deposition device 304 is shown applying a spray 303 to the SNF transportation and storage container 301. In addition to the coating being applied to the SNF transportation and storage container 301, the coating 305 can be applied to spent nuclear fuel (SNF) support structures including metallic support structure used in storage pool racks, in support baskets inside the dry storage containers, inside the transportation casks, and inside the disposal container for spent nuclear fuels.

In the case of a boron-containing iron-based amorphous metal, engineered for exceptional corrosion resistance through manipulation of chromium, molybdenum and tungsten concentration, it has been shown that a coating with a thickness of approximately one millimeter (1 mm) on the spent fuel support structure (also known as the basket) inside of a proposed spent fuel disposal container for a proposed geologic repository can reduce the criticality factor (k-effective) by as much as ten percent (10%). This is a dramatic improvement in criticality safety in such engineered systems.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The Invention claimed is:

1. A method of forming a corrosion resistant neutron absorbing coating on a spent nuclear fuel support structure, comprising the steps of:

producing a coating spray by providing amorphous metal, providing a neutron-absorbing material, and combining said amorphous metal and said neutron-absorbing material into a coating spray of combined amorphous metal and neutron-absorbing material; wherein said coating spray of combined amorphous metal and neutron-absorbing material contains undesirable particles with corrosion-prone bcc ferrite phase from boron-containing iron-based amorphous metal powders and further comprising the step of using a magnetic field for separating said undesirable particles with corrosion-prone bcc ferrite phase from said coating spray of combined amorphous metal and neutron-absorbing material;

providing ceramic particles;

wherein said step of combining said amorphous metal and said neutron-absorbing material into a coating spray of combined amorphous metal and neutron-absorbing material further comprises combining said amorphous metal, said neutron-absorbing material, and said ceramic particles into an amorphous metal/neutron-absorbing material/ceramic particles coating spray;

positioning the spent nuclear fuel support structure and said coating spray of combined amorphous metal/neutron-absorbing material/ceramic particles in a position where said coating spray of combined amorphous metal neutron-absorbing material/ceramic particles is directed onto the spent nuclear fuel support structure; and spray processing the spent nuclear fuel support structure by spray processing the spent nuclear fuel support structure using said combined amorphous metal/neutron-absorbing material/ceramic particles coating spray of said combined amorphous metal/neutron-absorbing material/ceramic particles by cold spray deposition or thermal spray deposition of said combined amorphous metal/neutron-absorbing material/ceramic particles on the spent nuclear fuel support structure to form a composite material made of said combined amorphous metal/neutron-absorbing material/ceramic particles on the spent nuclear fuel support structure thereby producing homogenous metallic alloy that contains said combined amorphous metal neutron-absorbing material/ceramic particles on the spent nuclear fuel support structure.

* * * * *